United States Patent [19]

Sennstrom

[11] 3,818,568

[45] June 25, 1974

[54] APPARATUS FOR FORMING HEAT EXCHANGERS

[75] Inventor: Harold R. Sennstrom, Waynesboro, Pa.

[73] Assignee: Teledyne Mid-America Company, Los Angeles, Calif.

[22] Filed: Mar. 29, 1973

[21] Appl. No.: 346,120

[52] U.S. Cl. .......................... 29/202 D, 113/118 D
[51] Int. Cl. ............................................. B23p 15/26
[58] Field of Search....... 29/202 D, 202 R, 157.3 C, 29/423; 113/118 R, 118 D

[56] References Cited
UNITED STATES PATENTS

| | | | |
|---|---|---|---|
| 2,281,299 | 4/1942 | Steenstrap | 113/118 R |
| 2,585,043 | 2/1952 | Sandberg | 29/157.3 C X |
| 2,646,259 | 7/1953 | Powell | 29/157.3 C X |
| 2,661,191 | 12/1953 | Sandberg | 113/118 R X |
| 2,666,981 | 1/1954 | Sandberg | 29/157.3 C |
| 2,732,615 | 1/1956 | Sandberg | 29/157.3 C |
| 2,940,737 | 6/1960 | Sandberg | 113/118 R |
| 3,562,058 | 2/1971 | Boyd | 29/423 |

Primary Examiner—Thomas H. Eager
Attorney, Agent, or Firm—Strauch, Nolan, Neale, Nies & Kurz

[57] ABSTRACT

Apparatus for securing a backing sheet to a length of tubing to form heat exchange structure particularly useful as a condenser in a household refrigerator.

Spring fingers engage the sides of open grooves in the backing sheet in which the tubing is received to cause the walls of said grooves to be deformed to embrace the tubing and lock the tubing to the backing sheet.

1 Claim, 3 Drawing Figures

PATENTED JUN 25 1974 3,818,568

APPARATUS FOR FORMING HEAT EXCHANGERS

BACKGROUND OF THE INVENTION

For many years condensers of the type employed on household refrigerators have comprised a length of tubing of serpentine configuration extending vertically along the outer surface of the rear wall of the refrigerator cabinet. To improve the heat exchange efficiency of units of this type, it has been proposed to mount a plate structure on the tubing, the plate structure extending between the parallel lengths of tubing.

Despite the inherently improved performance of the plate and tube condenser, such condensers have not come into widespread use, principally because of the difficulty and relatively high cost of manufacture of such assemblies, especially the cost of securing the plate structure to the tube assembly with the intimate contact required to assure efficient thermal conduction.

Prior proposals for brazing, soldering or welding the parts together have proved to be prohibitively expensive.

Other proposals for effecting a purely mechanical contact between the plate and tube as disclosed, for example, in U.S. Pat. Nos. 2,281,299; 2,585,043; 2,646,259; 2,664,012; 2,661,191; 2,666,981; 2,732,615, and 2,940,737 have not, insofar as is known, come into general use, apparently because of cost factors, reliability, or because they depend upon the use of relatively heavy gauge plate structures. In addition, the prior apparatus requires that the portion of the plate extending between the parallel tube section be essentially flat, since it must be clamped by the mechanism to insure the proper crimping action, which is relied on to provide the secure connection between the tube and plate structure.

SUMMARY OF THE PRESENT INVENTION

It is the principal purpose and object of the present invention to provide improved apparatus for the manufacture of tube and plate heat exchangers which reduces the cost of manufacture of such heat exchangers and at the same time provides heat exchangers having improved heat exchange efficiency.

It is also an object of the present invention to provide improved apparatus for manufacturing tube and plate heat exchangers, the apparatus accommodating a wide variety of materials and structural configurations.

It is a further object of the present invention to provide the improved apparatus for manufacturing plate and tube heat exchangers which are durable, have a relatively long, trouble-free service life, and a relatively low initial cost.

These and other objects of the present invention are obtained by the provision of apparatus including a series of parallel support members having a spacing and length corresponding to the spacing and length of the straight portions of a serpentine heat exchanger coil.

Prior to the operation of the subject apparatus, the plate is preformed to provide a series of parallel grooves which receive the tube sections, the sides of the grooves embracing approximately one half the periphery of the tube section.

The subject apparatus also includes pairs of spring members carried by a movable head or platen, the adjacent longitudinal edges of adjacent fingers being adapted to engage the side portions of the plate grooves adjacent to the outer edges of the grooves. After engagement the support structure prevents further movement of the spring members in a direction normal to the plane of the plate and because of the configuration of the spring members and the associated platen the spring members move thereafter in a direction parallel to the plane of the plate upon further movement of the platen normal to the plate. In this further movement the spring members force the outer edges of the grooves around the tube sections thus securely uniting the plate and tube sections.

Additional objects and advantages of the present invention will become apparent as the description proceeds in connection with the drawings.

THE DRAWINGS

DESCRIPTION OF PREFERRED EMBODIMENT

Figure 1:
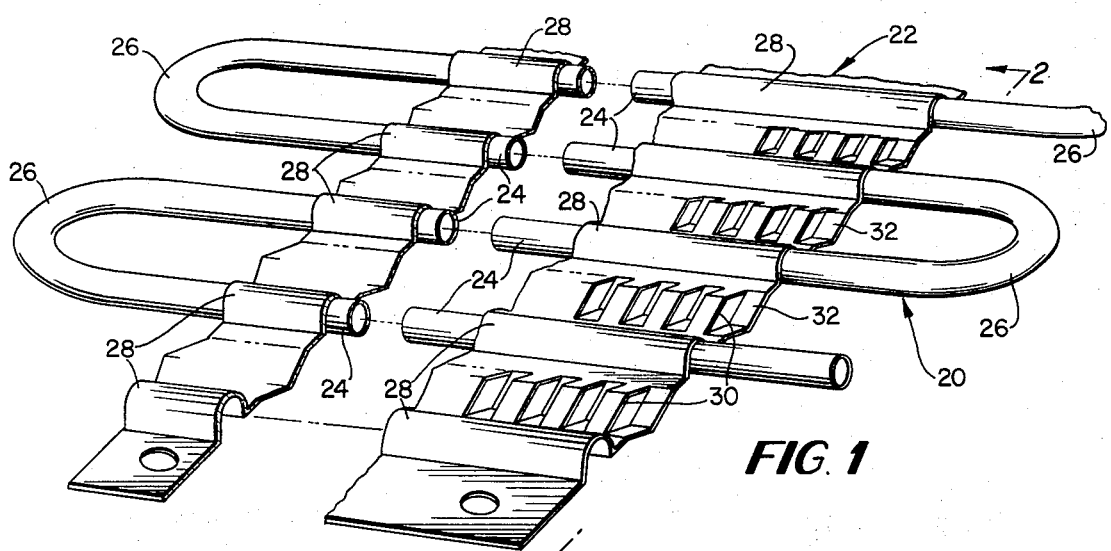
FIG. 1 is an isometric view illustrating a typical preformed plate and tube heat exchanger assembly as supplied to the apparatus of the present invention for final assembly.

Referring now more particularly to the drawings, FIG. 1 illustrates a partially assembled plate and tube heat exchanger including a continuous length of tubing 20 and a plate structure 22. In accordance with conventional practice the tubing typically has an O.D. of approximately ¼ inch and has sufficient wall thickness so that it is relatively rigid and will retain its configuration under the application of moderate external or internal forces. The tubing is formed to a serpentine configuration having parallel straight sections 24 connected by reverse bends 26. In a typical case the straight sections are spaced apart 1 ½ inches and are several feet in length.

The plate assembly 22 is typically formed from aluminum or steel and since it is not relied on for structural rigidity it is preferably made of relatively thin gauge metal, for example, 0.025 inches.

Figure 2:
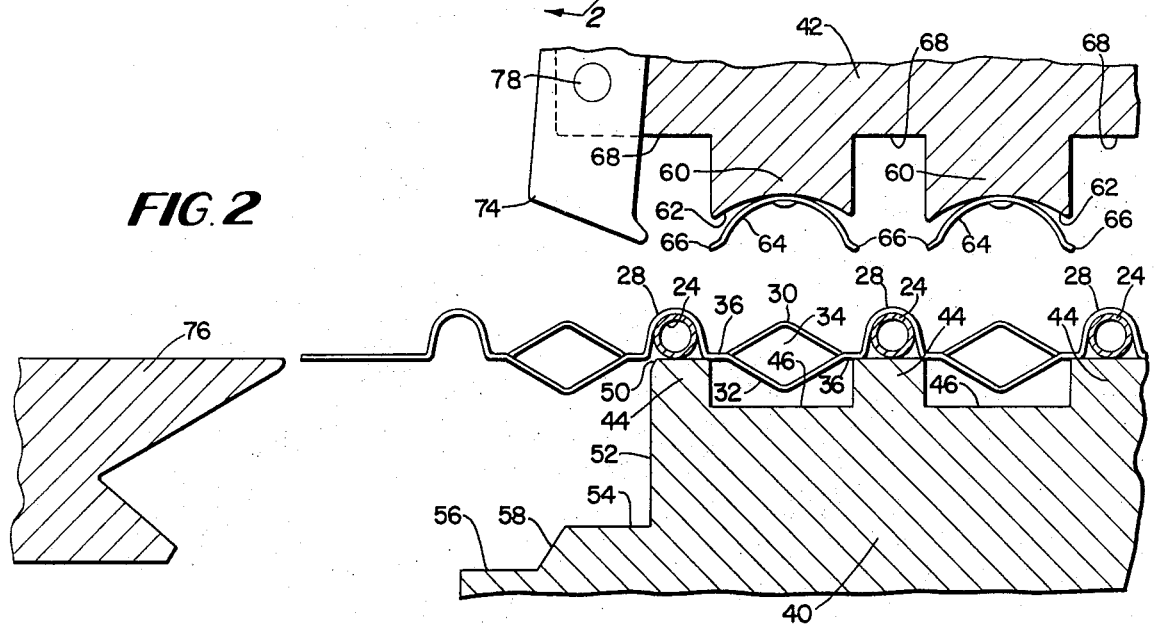
FIG. 2 is a transverse section taken along line 2—2 of FIG. 1.

Prior to final assembly the plate structure is preformed to the configuration illustrated in FIGS. 1 and 2 and includes a series of parallel longitudinally extending grooves 28, formed to receive the tube lengths 24 with a relatively snug fit.

To improve the heat exchange efficiency of the assembly, the portions of the plate structure between the grooves 28 are preformed to provide short strip sections 30 and 32 which are displaced oppositely from the plane of the plate structure. When the assembly is installed vertically along the rear wall of the refrigerator cabinet the strips 30 and 32 effectively form air channels 34 through which air rises by convection. The strip sections 30 and 32 are connected to the grooves 28 by narrow flat sections 36.

Figure 3:
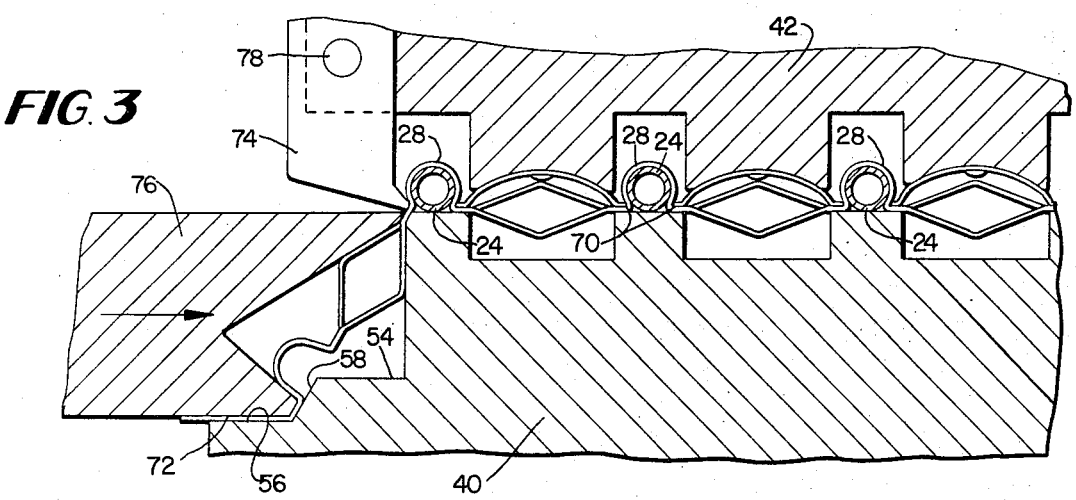
FIG. 3 is a view similar to FIG. 2 but illustrating the apparatus as it appears after completion of the assembly of the heat exchanger.

Referring now more particularly to FIGS. 2 and 3 the apparatus of the present invention includes a fixed base platen 40 and a vertically displaceable head platen 42. The base platen is provided with a plurality of upwardly projecting support portions 44 having a spacing and length corresponding to the spacing and length of the straight tube portions 24 and a width sufficient to support the tube sections 24 and portions of the plate section 36 at opposite sides of each tube section. Between the support portions 44 the base platen 40 is cut away as at 46 to accommodate the lower plate strip sections 32.

The marginal edges of the base platen 40 are formed in any suitable manner to meet the requirements of a particular installation. In the illustrated embodiment the marginal support portion 44 is beveled as at 50 and the lateral edge of the platen is provided with a vertical wall 52 and horizontal wall portions 54 and 56 connected by an inclined wall 58.

The upper head platen 42 includes a series of longitudinally extending support portions 60 having the same spacing, width and length as the corresponding dimensions of the portions of the plate between the grooves 28. Suitably secured to the bottom arcuate surface 62 of the support portions 60 are spring steel slats 64 which extend the full length of the support portion 60. The slats are preferably formed of spring steel typically from 0.025 inches to 0.075 inches in thickness.

When relaxed, the slats 64 assume the configuration shown in FIG. 2, and have a curvature substantially greater than the curvature of the surface 62 on the associated support structure. In this configuration the spacing of the marginal edges 66 of the slats is slightly less than the spacing between the outer walls of the grooves 28 in the plate structure. Between the support sections 60 the head platen 42 is cut away as at 68 to provide full length recesses having a depth substantially greater than the depth of the plate grooves 28.

It will be understood that the base platen 40 and the head platen 42 are mounted in essentially conventional stamping or press apparatus. Preferably the base platen 40 is fixed and the upper head is carried by a vertically moveable ram effective to displace the head platen between the positions shown in FIG. 2 and FIG. 3.

In the operation of the apparatus the preformed and preassembled plate and tube assembly is positioned on the lower base platen as shown in FIG. 2. The upper head platen is then displaced downwardly from the position shown in FIG. 2 to the position shown in FIG. 3. As the upper head is lowered the marginal edges 66 of the spring slats initially contact the plate assembly essentially at the juncture of the narrow flat portions 36 and the adjacent walls of the grooves 28. In the continued downward movement of the head platen the spring slats are flexed, causing the edges of the slats 66 to spread laterally, the final position of the parts being shown in FIG. 3. Accordingly, the walls of the plate grooves 28 are moved together to form re-entrant portions 70 which securely lock the tube and plate structure together. At the same time the metal which forms the sidewalls and base portion of the grooves 28 is forced into tight frictional engagement with the outer periphery of the tube portions 24 thus assuring the necessary intimate contact between the parts to assure efficient thermal conductivity.

It will be noted that the channels 34 formed between the strips 30 and 32 are flattened to a certain extent during the final forming operation. This action occurs with little tensile stress on the metal, thus avoiding any metal stretching and permitting the use of very thin gauge metals in the plate structure. Also, since the forming action involves metal bending rather than drawing or stretching, the operating forces are relatively low and wear on the parts is minimized. Finally, since the portions of the plate structure between adjacent tubes is not contacted by the forming mechanism it may assume any desired configuration which may be dictated solely by design criteria for maximum efficiency.

As stated above, the marginal edge of heat exchanger assembly may assume a variety of configurations, depending on the requirements of the particular installation. In the illustrated embodiment, the marginal edge of the assembly is formed to provide a mounting flange 72 parallel to but offset from the plane of the tube assembly. The unit is formed to this configuration by a pair of fingers 74 and 76, the former being pivotally mounted as at 78 on the head platen and the latter being mounted for horizontal reciprocation and any suitable means not shown.

As the upper head 42 reaches its lower position shown in FIG. 3 the finger 74 is rotated slightly in a counterclockwise direction by conventional means not shown from its inactive position shown in FIG. 2 to its active position shown in FIG. 3 forcing a portion of the plate structure against the beveled shoulder 50 and displacing the entire outer edge portion of the tube downwardly against the outer edge of the surface 56. Thereafter a suitable side slide (not shown) advances the finger 76 to the position shown in FIG. 3 to complete the formation of the flange 72. Thereafter the finger 76 is withdrawn. The finger 74 is rotated to its inactive position, and the upper head platen is raised to the position shown in FIG. 2. The completed assembly is then removed and replaced by a new assembly and the foregoing operations are repeated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to be secured by letters Patent is:

1. Apparatus for securing plate structure to tube structure comprising a pair of relatively movable platens, one of said platens being adapted to support parallel lengths of tubing positioned in grooves in said plate structure, means on the other platen forming surfaces facing said one platen, elongated spring members carried by said surfaces, said spring members being curved in transverse section to dispose the longitudinal edges thereof in spaced relation to said surfaces, and the spacing between adjacent marginal edges of adjacent ones of said spring members being slightly less than the spacing between adjacent lengths of tubing whereby when said platens are relatively moved together, the marginal edges of said spring members engage said plate structure at opposite sides of said lengths of tubing, and, in the continued relative movement of said platens, said marginal edges are displaced laterally away from each other to cause said plate structure to embrace substantially more than half of the periphery of adjacent tube structure.

* * * * *